United States Patent [19]

Tanaka et al.

[11] Patent Number: 4,500,649
[45] Date of Patent: Feb. 19, 1985

[54] PROCESS FOR PRODUCING AQUEOUS SUSPENSION CONTAINING ORGANIC AZO COMPOUND AS POLYMERIZATION INITIATOR

[75] Inventors: Motoaki Tanaka, Urawa; Takanori Toyama, Kawagoe; Hitoshi Ohba, Saitama; Osamu Yamaguchi, Sayama, all of Japan

[73] Assignee: Wako Pure Chemical Industries, Ltd., Japan

[21] Appl. No.: 433,690

[22] Filed: Oct. 12, 1982

[30] Foreign Application Priority Data

Oct. 12, 1981 [JP] Japan ................................ 56-162190

[51] Int. Cl.³ ............................................ B01J 31/06
[52] U.S. Cl. .................................... 502/167; 502/150; 502/151; 526/199; 526/200; 526/201; 526/207; 526/210; 526/218.1
[58] Field of Search ................ 252/426; 526/199, 200, 526/201, 202, 203, 344.2, 207, 210, 218.1; 502/150, 167

[56] References Cited

U.S. PATENT DOCUMENTS

| | | | |
|---|---|---|---|
| 3,974,133 | 8/1976 | Evans | 526/207 |
| 4,002,812 | 1/1977 | Hendy | 526/200 |
| 4,011,388 | 3/1977 | Murphy et al. | 526/201 |
| 4,330,653 | 5/1982 | Klippert et al. | 526/344.2 |
| 4,376,719 | 3/1983 | Goodman et al. | 502/159 |
| 4,391,962 | 7/1983 | Schreurs et al. | 526/200 |
| 4,429,085 | 1/1984 | Henderson et al. | 502/167 |

*Primary Examiner*—Delbert E. Gantz
*Assistant Examiner*—Anthony McFarlane
*Attorney, Agent, or Firm*—Armstrong, Nikaido, Marmelstein & Kubovcik

[57] ABSTRACT

A stable aqueous suspension containing an organic azo compound as polymerization initiator in fine particles, containing substantially no organic solvent and containing no foam which damages dispersing stability of the aqueous suspension and retards polymerization rate can be formed by dissolving an organic azo compound in an organic solvent, emulsifying the resulting solution by adding water and a dispersing agent A and a dispersing agent B thereto with stirring, and removing the organic solvent from the emulsified liquid preferably under reduced pressure.

19 Claims, No Drawings

PROCESS FOR PRODUCING AQUEOUS SUSPENSION CONTAINING ORGANIC AZO COMPOUND AS POLYMERIZATION INITIATOR

This invention relates to a process for producing an aqueous suspension containing fine particles of organic azo compound as polymerization initiator. More particularly, this invention relates to a process for producing an aqueous suspension containing an organic azo compound in fine particles as polymerization initiator, containing substantially no organic solvent, containing no foam which damages dispersing stability of the aqueous suspension and retards polymerization rate, having dispersing stability for a long period of time, and having a low viscosity for easily transporting the aqueous suspension.

Azo compounds which are excellent polymerization initiators have been introduced into a polymerization reaction system as small blocks or as powder or as a solution thereof, but they had a defect in that rapid uniform dispersion into the polymerization system is difficult in the case of suspension polymerization since they are present as crystals.

In order to give an aqueous suspension containing an azo compound uniformly dispersed in fine particles, there is proposed a process wherein an azo compound is mechanically ground in fine particles having an average particle size of about 10 μm or less, e.g., by using a jet mill in the dry process, a ball mill (including an oscillating mill and a tower-type attritor) in the wet process, or by an ultrsonic vibration process at a temperature of a melting point of azo compound or less, and is suspended in water (Japanese Patent Appln Kokai (Laid-Open) No. 151544/80). But the resulting aqueous suspension is disadvantageous in that a polymerization reaction using said aqueous suspension cannot be conducted desirably. Since said aqueous suspension is obtained by mechanical stirring in the presence of a dispersing agent, there are produced foams, which form an apparent condensed emulsified liquid together with very fine particles of solid azo compound. Such foams are hardly broken even by vacuum defoamation. Since the azo compound dispersion step is usually conducted in air, the foams produced usually contain air or oxygen, which seems to give undesirable influences on the succesive polymerization reaction.

In order to solve such a problem, there is proposed a process wherein the azo compound dispersion step is conducted in an inert gas, preferably in a nitrogen atmosphere (Japanese Patent Appln Kokai (Laid-Open) No. 45906/81). But foams produced containing an inert gas such as nitrogen adhere to the azo compound which belongs to a hydrophobic substance and damages uniformity and quantitativeness of the aqueous suspension and also damages dispersing stability for a long period of time by making the azo compound adhered to the foams to float with the lapse of time.

Here, the dispersing stability for a long period of time means that when the aqueous suspension is stored at a temperature of 10° C. or less, the aqueous suspension maintains (1) physical stability (showing no separation of the aqueous layer or almost no change in viscosity), and (2) chemical stability (showing no change in the content compared with the initial content) for one month or more.

It is an object of this invention to provide a process for producing an aqueous suspension containing an organic azo compound in fine particles as polymerization initiator, containing substantially no organic solvent, containing no foam which damages dispersing stability of the aqueous suspension and retards polymerization rate, and having dispersing stability for a long period of time.

This invention provides a process for producing an aqueous suspension containing an organic azo compound as polymerization initiator in fine particles, containing substantially no organic solvent, containing no foam which damages dispersing stability of the aqueous suspension and retards polymerization rate, and having dispersing stability for a long period of time which comprises dissolving an organic azo compound in an organic solvent, emulsifying the resulting solution by adding water and a dispersing agent A and a dispersing agent B thereto, and removing the organic solvent from the emulsified liquid.

According to this invention, an organic azo compound is dissolved in an organic solvent, the resulting solution is emulsified by adding water and suitable amounts of dispersing agents with stirring to give a uniform and stable emulsion, and the organic solvent is removed from the emulsion at low temperatures, preferably 20° C. or lower, by condensation to give an aqueous suspension containing 1 to 50 parts by weight of azo compound in very fine particles having an average particle size of about 100 μm or less, mostly about 20 μm or less, 0.001 to 20 parts by weight of dispersing agents, and 30 to 99 parts by weight of water, total being 100 parts by weight, containing substantially no organic solvent, containing no foam which damages dispersing stability of the aqueous suspension and retards polymerization rate, having dispersing stability for a long period of time, and having a low viscosity for easily transporting the aqueous suspension.

More in detail, an organic azo compound is dissolved in an organic solvent preferably having a boiling point of 100° C. or less. To the resulting solution, water is added and then one or more dispersing agents selected from the following groups A and B are added in suitable amounts, followed by usual stirring or by using a mixer with high shearing or a homogenizer to give a uniform and stable emulsion. Subsequently, the organic solvent is removed from the emulsion under reduced pressure preferably 10 to 100 mm Hg, more preferably 10 to 50 mm Hg with stirring in most cases. Then, the azo compound in very fine particles having an average particle size of about 100 μm or less, mostly about 20 μm or less, is deposited in the form of crystals and there is obtained an aqueous suspension containing 1 to 50 parts by weight of azo compound, 0.001 to 20 parts by weight of dispersing agents, and 30 to 99 parts by weight of water, total being 100 parts by weight, containing substantially no organic solvent and having fluidity for easily transporting the aqueous suspension.

These procedures are usually conducted at a temperature equal to or lower than the melting point of azo compound, preferably at lower temperatures suitable for preventing completely deterioration due to the activity of the azo compound (usually 5° to 20° C.). Further, it is effective to add a small amount of anti-foaming agent (e.g., KM-72, a trade name, mfd. by Shin-etsu Silicone Co., Ltd., etc.) during the removal of organic solvent under reduced pressure by condensation for giving the aqueous suspension containing no foam.

Since the azo compound aqueous suspension obtained in this invention contains no foam therein, there takes place no damage on polymerization reaction due to contamination of oxygen nor damage on qunatitativeness. Further, the aqueous suspension has excellent dispersing stability for a long period of time, for example, one month or more. In addition, since no expensive grinder is used and the steps are simplified, the process of this invention is very advantageous from the viewpoint of production cost. Moreover, since the aqueous suspension obtained in this invention contains solid azo compound in very fine particles usually having an average particle size of about 20 μm or less and suitable amounts of dispersing agents, it can be supplied to the polymerization system as a stable dispersing suspension, which results in improving the working steps and operating efficiency, dispersing the aqueous suspension in the aqueous medium of polymerization system very finely, rapidly and uniformly, dissolving effectively the aqueous suspension in oil drops of polymerizable monomer or monomers, shortening the polymerization time required very remarkably, so that the resulting polymer is improved in quality remarkably partly due to containing no solvent other than water in the aqueous suspension. As mentioned above, effects obtained by the process of this invention are very remarkable, so that the contribution of this invention to this art is very great.

As the organic azo compound, there can be used those solid at normal temperatures or less such as 2,2'-azobisisobutyronitrile, 2,2'-azobis(2,4-methylvaleronitrile), 2,2'-azobis(2,3,3-trimethylvaleronitrile), 2,2'-azobis(2,4,4-trimethylvaleronitrile), 2,2'-azobis(2-cyclopropylpropionitrile), 1,1'-azobis(cyclohexane-1-carbonitrile), 2,2'-azobis(2,4-dimethyl-4-methoxyvaleronitrile), 2-t-butyl-azo-2,4,4-trimethylvaleronitrile, 2-α-naphthylazoisobutyronitrile, 2,2'-azobis(methyl isobutyrate), 2,2'-azobis(N,N'-dimethyleneisobutylamidine), etc. These azo compounds can be used alone or as a mixture thereof.

The content of the organic azo compound in the aqueous suspension is preferably 1 to 50 parts by weight, more preferably 5 to 40 parts by weight, based on 100 parts by weight of the aqueous suspension.

As the organic solvent, there can be used ethers such as ethyl ether, isopropyl ether, etc.; aromatic hydrocarbons such as benzene, toluene, xylenes, ethylbenzene, etc.; alcohols such as n-butyl alcohol, isobutyl alcohol, isoamyl alcohol, etc.; esters such as ethyl acetate, straight-chain or cyclic hydrocarbons such as n-hexane, n-heptane, n-nonane, cyclohexane, etc.; halogenated hydrocarbons such as methylene chloride, dichloroethane, chloroform, carbon tetrachloride, trichloroethylene, etc. Among them, those having good solubility to the azo compound are preferable, and those having a boiling point or an azeotropic point with water of 100° C. or less are more preferable. These organic solvent can be used alone or as a mixture thereof. It is also possible to use the organic solvent together with a water-soluble solvent. The organic solvent is used usually in a minimum amount necessary for dissolving the azo compound at low temperatures, preferably 20° C. or lower.

As the dispersing agents, there can preferably be used one or more suspending agents usable in suspension polymerization selected from the following groups A and B, respectively.

The dispersing agent belonging to the group A (the dispersing agent A) functions as a thickening agent and a dispersing agent. Examples of the dispersing agent A are synthetic high polymers such as polyethyleneimine, polyethylene oxide, polyvinyl alcohol, polyvinyl pyrrolidone, polyacrylamide, carboxy vinyl polymers or their salts (preferably alkali metal salts, ammonium salts or organic amine salts), etc.; cellulose derivatives such as methyl cellulose, carboxymethyl cellulose, hydroxyethyl cellulose, hydroxypropyl cellulose, hydroxylpropylmethyl cellulose, cellulose acetate phthalate, etc.; animal proteins such as animal glue, gelatin, etc.; vegetable mucilages such as gum arabic, pectin, saponin, etc.; materials derived from seaweeds such as alginic acid, carrageenin, etc.; starches, fabricated starches, etc. Among them, examples of carboxy vinyl polymers or their salts are straight-chain or crosslinking type acrylic polymers, methacrylic polymers or copolymers thereof, copolymers of acrylic or methacrylic acid and vinyl alcohol, and their salts (preferably alkali metal salts, ammonium salts or organic amine salts).

The dispersing agent belonging to the group B (the dispersing agent B) functions as a emulsifier and a dispersing agent. Examples of the dispersing agent B are nonionic, cationic and anionic surface active agents, preferably nonionic surface active agents, such as sorbitan monolaurate, sorbitan monooleate, sorbitan sesquioleate, glyceryl monostearate, polyoxyethylene nonyl phenyl ether, polyoxyethylene sorbitan monolaurate, etc.

In this invention, in place of the synthetic high polymer of the dispersing agent A, there can be used a polymer obtained by polymerizing one or more polymerizable monomers in the presence of the dispersing agent B, the surface active agent, under nitrogen stream. Alternatively, one or more polymerizable monomers are polymerized in the emulsion obtained by adding water, the surface active agent to the organic solvent dissolving the azo compound under nitrogen stream, followed by removing the organic solvent from the emulsion to give the desired aqueous suspension containing azo compound as polymerization initiator in fine particles, containing substantially no organic solvent and having dispersing stability stability for a long period of time. As the polymerizable monomer, there can be used hydrophilic polymerizable monomers such as acrylamide, acrylic acid, methacrylic acid and their salts (for example, alkali metal salts, ammonium salts, water-soluble organic amine salts, the organic amine salts being salts of lower alkylamines such as dimethylamine, diethylamine, trimethylamine, triethylamine, etc.), and the like. The adding amount of the polymerizable monomer depends on the viscosity of the resulting aqueous suspension. Usually, 0.1 to 10 parts by weight, preferably 0.2 to 5 parts by weight of the polymerizable monomer is added based on 100 parts by weight of the resulting aqueous suspension.

The adding amount of the dispersing agent a is preferably 0.001 to 10 parts by weight, more preferably 0.01 to 1 parts by weight based on 100 parts by weight of the resulting aqueous suspension.

The adding amount of the dispersing agent B is preferably 0.1 to 10 parts by weight, more preferably 0.2 to 5 parts by weight based on 100 parts by weight of the resulting aqueous suspension.

As the water, there can usually be used deionized water or distilled water.

This invention is illustrated by way of the following Examples, in which all percents are by weight unless otherwise specified.

EXAMPLE 1

In a 1 liter flask equipped with a stirrer, a condenser connected to a cold trap and an aspirator, 2.2 g of sorbitan monolaurate and 150 g of 1% methyl cellulose aqueous solution were placed and mixed well for dissolution. While cooling at 15° C. or less with stirring, a solution obtained by dissolving 88 g of 2,2'-azobisisobutyronitrile in 150 g of ethyl acetate was added to the flask dropwise to give a stable emulsion. The ethyl acetate was removed from the emulsion by distillation under reduced pressure of about 50 mm Hg at 15° C. or less until no residual ethyl acetate was detected to give a cream-like aqueous suspension having about 37% of 2,2'-azobisisobutyronitrile, a viscosity of 3800 cps (by a Brookfield viscometer) and an average particle size of 20 μm or less (95%).

The thus obtained aqueous suspension showed dispersing stability of about 2 months. After 2 months, there was found the formation of a small amount of the aqueous layer at the bottom of the vessel. But when the vessel was shaken for about 30 seconds, there was obtained a uniform aqueous suspension again, which further showed dispersing stability more than 1 month. When a part of the aqueous suspension was dissolved in acetone and measured by gas chromatography, no ethyl acetate was detected.

EXAMPLE 2

In the same flask as used in Example 1, 2.5 g of glyceryl monostearate, 170 g of 3% hydroxypropylmethyl cellulose and 1 ml of an anti-foaming agent (KM-68, a trade name, mfd. by Shin-etsu Silicone Co., Ltd.) were placed and mixed for dissolution. While cooling at 15° C. or less with stirring, a solution obtained by dissolving 66 g of 2,2'-azobis(2,4-dimethylvaleronitrile) in 250 g of isopropyl ether was added to the flask dropwise to give a stable emulsion. Using the same procedures as mentioned in Example 1, there was obtained a cream-like aqueous suspension having about 28% of 2,2'-azobis(2,4-dimethylvaleronitrile), a viscosity of 2200 cps and an average particle size of 20 μm or less (95%).

The thus obtained aqueous suspension showed the same dispersing stability as in Example 1. When a part of the aqueous suspension was dissolved in acetone and measured by gas chromatography, no isopropyl ether was detected.

EXAMPLE 3

In the same flask as used in Example 1, 3.2 g of sorbitan sesquioleate and 180 g of 1.5% hydroxyethyl cellulose were placed and mixed for dissolution. While cooling at 15° C. or less with stirring, a solution obtained by dissolving 52 g of 1,1'-azobis(cyclohexane-1-carbonitrile) in 80 g of methylene chloride was added to the flask dropwise to give a stable emulsion. Using the same procedures as mentioned in Example 1, there was obtained a cream-like aqueous suspension having about 22% of 1,1'-azobis(cyclohexane-1-carbonitrile), a viscosity of 1900 cps and an average particle size of 20 μm or less (95%).

The thus obtained aqueous suspension showed the same dispersing stability as in Example 1. When a part of the aqueous suspension was dissolved in acetone and measured by gas chromatography, no methylene chloride was detected.

EXAMPLE 4

The process of Example 1 was repeated except for using 540 g of aqueous solution of Na salt of crosslinking type poly(acrylic acid) (0.04%) as the carboxy vinyl polymer (Hibiswako 105, a trade name, mfd. by Wako Pure Chemical Industries, Ltd.) in place of the 1% methyl cellulose aqueous solution. There was obtained a cream-like aqueous suspension having about 27% of 2,2'-azobisisobutyronitrile, a viscosity of 480 cps and an average particle size of 20 μm or less (95%).

The thus obtained aqueous suspension showed the same dispersing stability as in Example 1. When a part of the aqueous suspension was dissolved in acetone and measured by gas chromatography, no ethyl acetate was detected.

EXAMPLE 5

In the same flask as used in Example 1, 8.0 g of glyceryl stearate, 190 g of 0.08% aqueous solution of ammonium salt of crosslinking type poly(acrylic acid) as the carboxy vinyl polymer (Hibiswako 103, a trade name, mfd. by Wako Pure Chemical Industries, Ltd.) and 1 ml of an anti-foaming agent (KM-72, a trade name, mfd. by Shin-etsu Silicone Co., Ltd.) were placed and mixed for dissolution. While cooling at 15° C. or less with stirring, a solution obtained by dissolving 66 g of 2,2'-azobis(2,4-dimethylvaleronitrile) in 250 g of isopropyl ether was added to the flask dropwise to give a stable emulsion. Using the same procedures as mentioned in Example 1, there was obtained a cream-like aqueous suspension having about 25% of 2,2'-azobis(2,4-dimethylvaleronitrile), a viscosity of 430 cps and an average particle size of 20 μm or less (95%).

The thus obtained aqueous suspension showed dispersing stability of about 40 days. After 40 days, there was found the formation of a small amount of the aqueous layer at the bottom of the vessel. But when the vessel was shaken for about 30 seconds, there was obtained a uniform aqueous suspension again, which further showed dispersing stability more than 1 month. When a part of the aqueous solution was dissolved in acetone and measured by gas chromatography, no isopropyl ether was detected.

EXAMPLE 6

In a 1 liter flask equipped with a stirrer, a thermometer, a nitrogen introducing pipe, and a condenser connected to a cold trap and an aspirator, 23 g of sorbitan monolaurate, 20 g of acrylamide and 562 g of deionized water were placed and mixed for dissolution. While cooling at 20° C. or less with stirring, a solution obtained by dissolving 150 g of 2,2'-azobisisobutyronitrile in 260 g of ethyl acetate was added dropwise to give a stable emulsion. The resulting emulsion was subjected to polymerization under nitrogen stream at 20° C. for 3 hours, followed by removal of the ethyl acetate by distillation at 20° C. under reduced pressure of about 50 mm Hg until no residual ethyl acetate was detected to give a cream-like aqueous suspension having about 20% of 2,2'-azobisbutyronitrile, a viscosity of 1200 cps and an average particle size of 20 μm or less (95%).

The thus obtained aqueous solution showed dispersing stability of about 50 days. After 50 days, there was found the formation of a small amount of the aqueous layer at the bottom of the vessel. But when the vessel was shaken for about 30 seconds, there was obtained a uniform aqueous suspension again, which further showed dispersing stability more than 1 month.

When a part of the aqueous solution was extracted with toluene and the absorbance at 347 nm was measured, the content of 2,2'-azobisisobutyronitrile was hardly changed compared with the charged amount. When a part of the aqueous suspension was dissolved in acetone and measured by gas chromatography, no ethyl acetate was detected.

EXAMPLE 7

In the same flask as used in Example 6, 8 g of glyceryl monostearate, 0.6 g of sodium acrylate, 1 ml of an antifoaming agent (KM-72, a trade name, mfd. by Shin-etsu Silicone Co., Ltd.) and 142 g of deionized water were placed and mixed for dissolution. While cooling at 20° C. or less with stirring, a solution obtained by dissolving 50 g of 2,2'-azobis(2,4-dimethylvaleronitrile) in 75 g of methylene chloride was added dropwise to give a stable emulsion. Using the same procedures as mentioned in Example 6, there was obtained a cream-like aqueous suspension having about 25% of 2,2'-azobis(2,4-dimethylvaleronitrile), a viscosity of 1080 cps, and an average particle size of 20 μm or less (95%).

The thus obtained aqueous suspension showed dispersing stability of about 40 days. After 40 days, there was found a small amount of aqueous layer at the bottom of the vessel. But when the vessel was shaken for about 30 seconds, there was obtained again a uniform aqueous suspension, which further showed dispersing stability more than 1 month.

The aqueous suspension no residue of methylene chloride.

EXAMPLE 8

In the same flask as used in Example 6, 5 g of sorbitan monooleate, 23 g of acrylamide and 172 g of deionized water were placed and mixed for dissolution. While cooling at 40° C. or less with stirring, a solution obtained by dissolving 60 g of 1,1'-azobis(cyclohexane-1-carbonitrile) in 120 g of ethylene chloride was added dropwise to give a stable emulsion. Using the same procedures as mentioned in Example 6 except for changing the reaction temperature to 40° C. or less, there was obtained a cream-like aqueous suspension having about 23% of 1,1'-azobis(cyclohexane-1-carbonitrile), a viscosity of 1530 cps, and an average particle size of 20 μm or less (95%).

The thus obtained aqueous suspension showed dispersing stability of more than 1 month. When a small amount of aqueous layer was formed at the bottom of the vessel, there was obtained a uniform aqueous suspension again by shaking the vessel for 30 seconds, said reformed aqueous suspension being stable for a long period of time.

The aqueous suspension contained no residue of ethylene chloride.

What is claimed is:

1. A process for producing an aqueous suspension containing an organic azo compound as polymerization initiator in fine particles which comprises:
    dissolving an organic azo compound in an organic solvent,
    emulsifying the resulting solution by adding water and a dispersing agent A and a dispersing agent B thereto, and
    removing the organic solvent from the emulsified liquid to give an aqueous suspension containing the organic azo compound as polymerization initiator in fine particles, containing substantially no organic solvent, containing no foam which damages dispersing stability of the aqueous suspension and retards polymerization rate, and having dispersing stability for a long period of time,
    wherein the dispersing agent A is a synthetic high polymer, a cellulose derivative, an animal protein, a vegetable mucilage, a material derived from seaweeds, starch, or fabricated starch; and the dispersing agent B is selected from the group consisting of nonionic, cationic and anionic surface active agents.

2. A process according to claim 1, wherein the aqueous suspension contains 1 to 50 parts by weight of the organic azo compound having an average particle size of 100 μm or less, 0.001 to 20 parts by weight of dispersing agents, and 30 to 99 parts by weight of water, total being 100 parts by weight.

3. A process according to claim 1, wherein the organic solvent is removed from the emulsified liquid at a temperature of 20° C. or lower under reduced pressure by distillation.

4. A process according to claim 1, wherein the organic azo compound is an organic azonitrile.

5. A process according to claim 1, wherein the organic solvent has a boiling point or an azeotropic point with water of 100° C. or lower.

6. A process according to claim 1, wherein the synthetic high polymer is polyethyleneimine, poly(ethylene oxide), poly(vinyl alcohol), poly(vinyl pyrrolidone), or polyacrylamide.

7. A process according to claim 1, wherein the synthetic high polymer is a carboxy vinyl polymer or a salt thereof.

8. A process according to claim 7, wherein the salt of carboxy vinyl polymer is an alkali metal salt, an ammonium salt or an organic amine salt of carboxy vinyl polymer.

9. A process according to claim 8, wherein the alkali metal salt is a sodium salt or potassium salt.

10. A process according to claim 8, wherein the organic amine salt is a salt of dimethylamine, diethylamine, trimethylamine, or triethylamine.

11. A process according to claim 7, wherein the carboxy vinyl polymer is a straight-chain or crosslinking type acrylic or methacrylic polymer or copolymer, or a copolymer of acrylic or methacrylic acid and vinyl alcohol.

12. A process according to claim 1, wherein the synthetic high polymer is a polymer obtained by polymerizing a monomer in the presence of a surface active agent, an organic azo compound dissolved in an organic solvent and water in emulsified form under nitrogen stream.

13. A process according to claim 12, wherein the monomer is acrylamide, acrylic acid, methacrylic acid, or an alkali metal salt, an ammonium salt or an organic amine salt of acrylic or methacrylic acid.

14. An aqueous suspension containing an organic azo compound as polymerization initiator in fine particles obtained by the process of claim 1.

15. A process for producing an aqueous suspension containing an organic azo compound as polymerization initiator in fine particles which comprises:

dissolving an organic azo compound in an organic solvent, adding water, a surface active agent, and one or more monomers to the resulting solution, conducting the polymerization of the polymerizable monomers under nitrogen stream in the resulting emulsion, and removing the organic solvent from the emulsified liquid to give an aqueous suspension containing the organic azo compound as polymerization initiator in fine particles, containing substantially no organic solvent, containing no foam which damages dispersing stability of the aqueous suspension and retards polymerization rate, and having dispersing stability for a long period of time.

16. An aqueous suspension containing an organic azo compound as polymerization initiator in fine particles obtained by the process of claim 15.

17. An aqueous suspension comprising an organic azo compound as polymerization initiator in fine particles; water; a dispersing agent A, the dispersing agent A being a synthetic high polymer, a cellulose derivative, an animal protein, a vegetable mucilage, a material derived from seaweeds, a starch or fabricated starch; and a dispersing agent B selected from the group consisting of a nonionic surface active agent, a cationic surface active agent, and an anionic surface active agent.

18. An aqueous suspension comprising an organic azo compound as polymerization initiator in fine particles, water, a dispersing agent A comprising a synthetic high polymer; and a dispersing agent B comprising a nonionic, cationic or anionic surface active agent.

19. An aqueous suspension comprising an organic azo compound as polymerization initiator in fine particles; water, a dispersing agent A comprising a carboxyvinyl polymer; and a dispersing agent B comprising a nonionic surface active agent.

* * * * *

UNITED STATES PATENT AND TRADEMARK OFFICE
CERTIFICATE OF CORRECTION

PATENT NO. : 4,500,649
DATED : February 19, 1985
INVENTOR(S) : TANAKA et al

It is certified that error appears in the above-identified patent and that said Letters Patent is hereby corrected as shown below:

In the cover page of the patent, after line 1, under the heading "[30] Foreign Application Priority Data," insert the following:
  --Sept. 3, 1982  [JP]   Japan............57-153570
    Sept. 14, 1982 [JP]   Japan............57-161521--

Signed and Sealed this

Sixteenth Day of July 1985

[SEAL]

Attest:

DONALD J. QUIGG

Attesting Officer    Acting Commissioner of Patents and Trademarks